Figure 1:
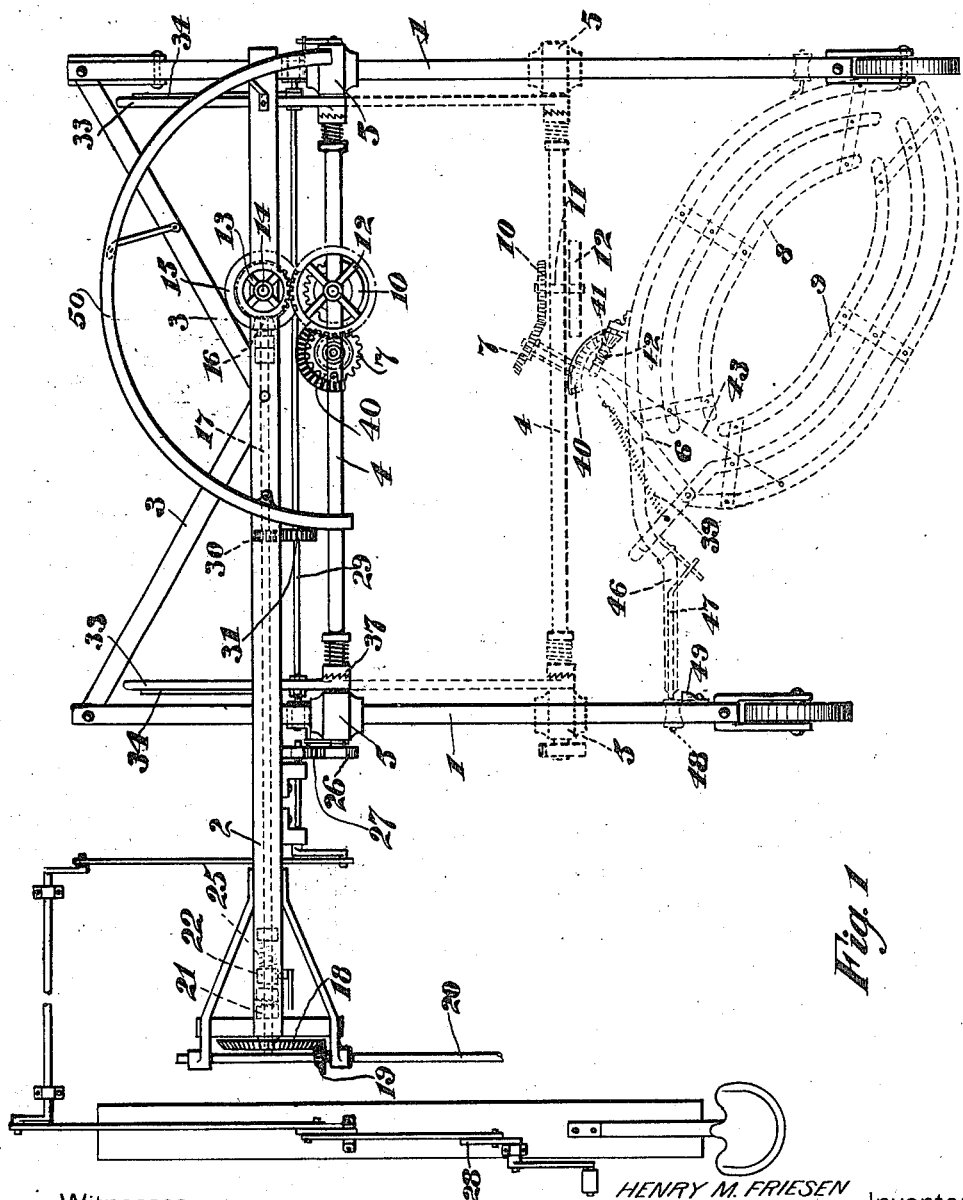

H. M. FRIESEN & H. H. NIKKEL.
GRAIN SHOCKER.
APPLICATION FILED JUNE 4, 1909.

984,897.

Patented Feb. 21, 1911.
4 SHEETS—SHEET 1.

Witnesses:

HENRY M. FRIESEN
& HEINRICH H. NIKKEL Inventors

By

Attorneys

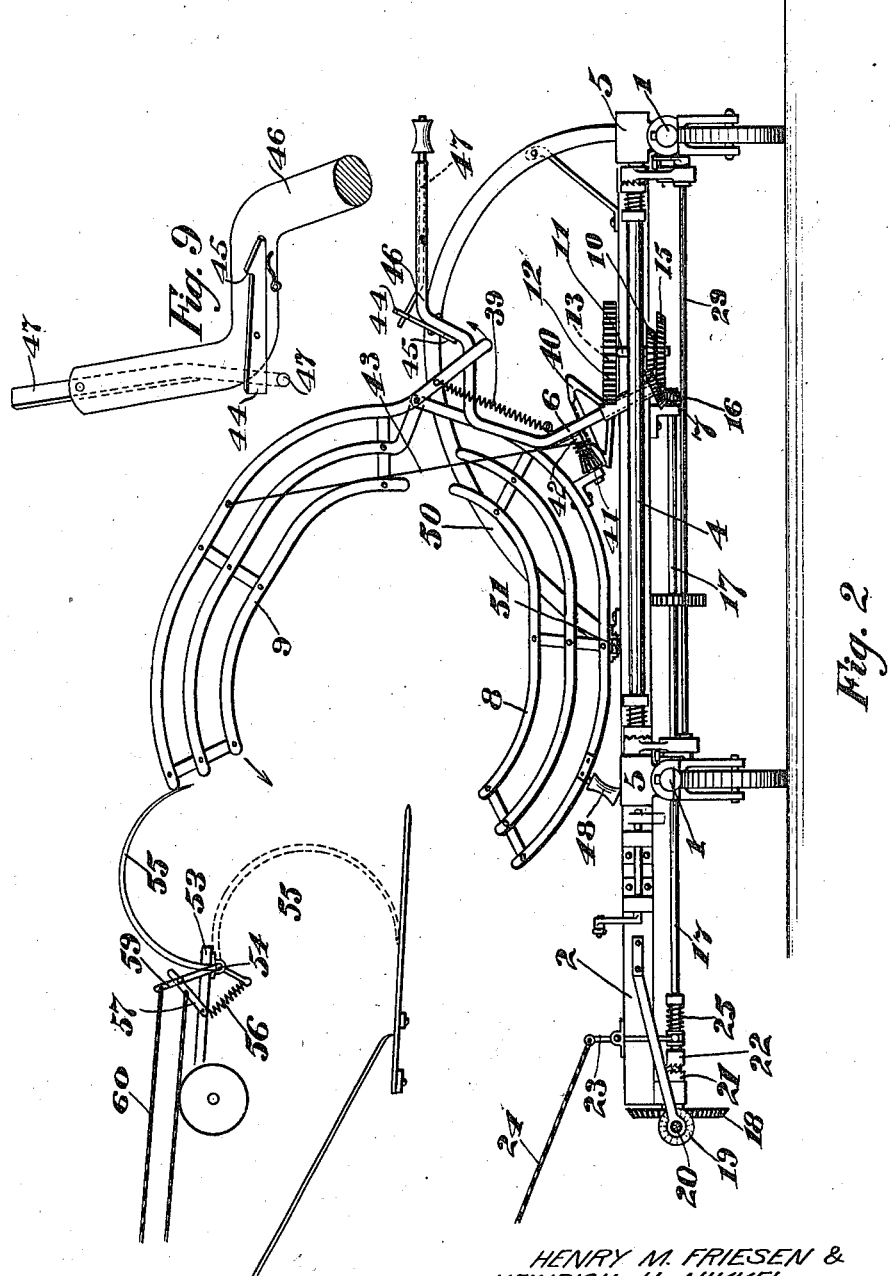

H. M. FRIESEN & H. H. NIKKEL.
GRAIN SHOCKER.
APPLICATION FILED JUNE 4, 1909.
984,897.
Patented Feb. 21, 1911.
4 SHEETS—SHEET 3.
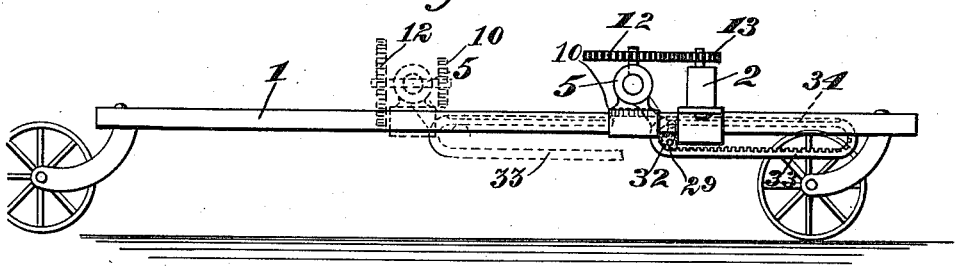
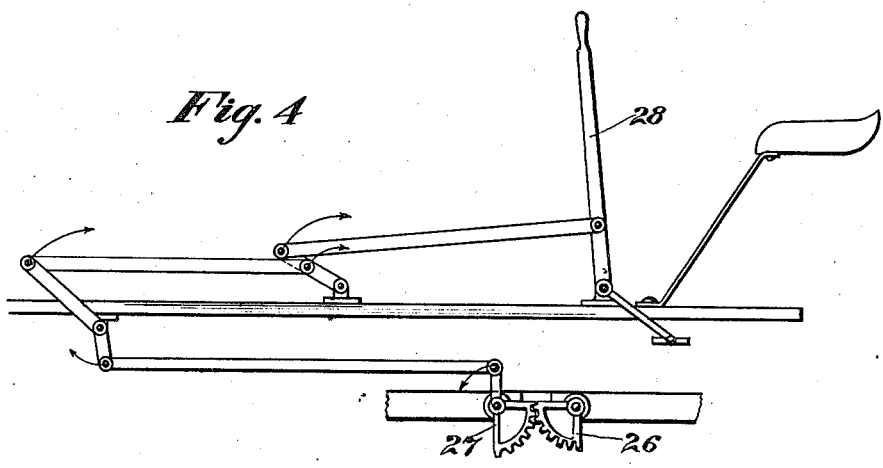
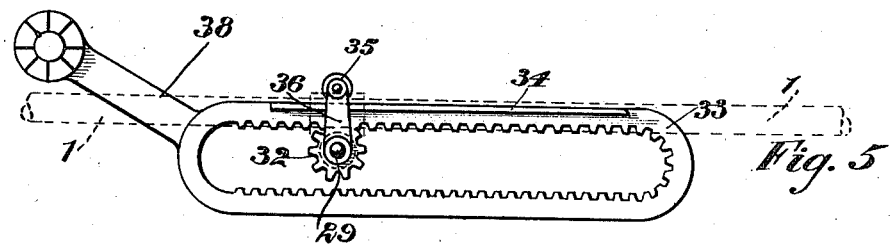
HENRY M. FRIESEN &
HEINRICH H. NIKKEL
Inventors
Witnesses:
By
Attorneys

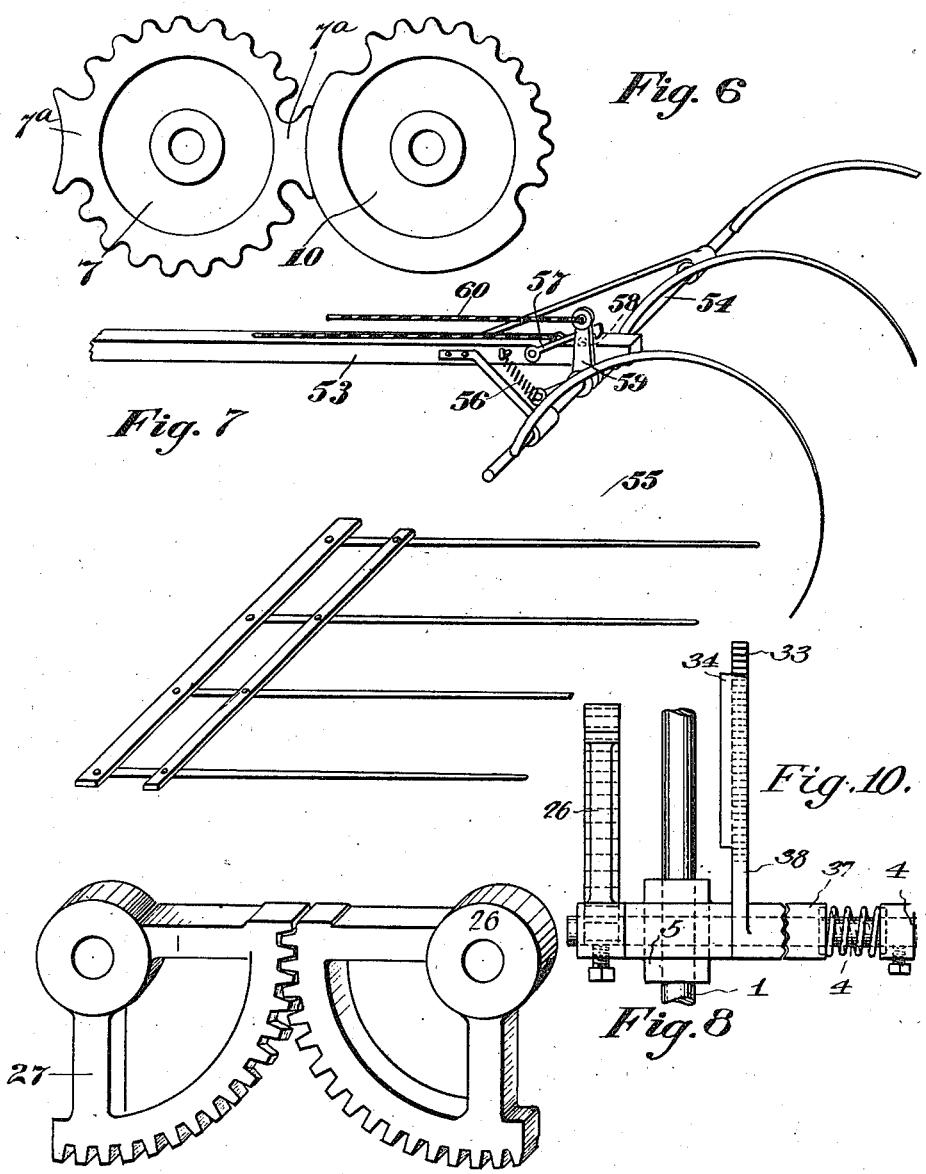

UNITED STATES PATENT OFFICE.

HENRY M. FRIESEN AND HEINRICH H. NIKKEL, OF ALTONA, MANITOBA, CANADA.

GRAIN-SHOCKER.

984,897.

Specification of Letters Patent. Patented Feb. 21, 1911.

Application filed June 4, 1909. Serial No. 500,222.

*To all whom it may concern:*

Be it known that we, HENRY M. FRIESEN and HEINRICH H. NIKKEL, subjects of the King of Great Britain, residing at Altona, county of Lisgar, in the Province of Manitoba, Canada, have invented certain new and useful Improvements in Grain-Shockers; and we do hereby declare that the following is a full, clear, and exact description of the invention, such as will enable others skilled in the art to which it appertains to make and use the same.

The invention to be hereinafter described relates to an attachment for grain harvesting machines, and particularly to a shocker attachment for grain harvesters.

Broadly speaking, it comprises a wheeled framework adapted to be connected to the frame of a harvesting machine, a two-part longitudinally reciprocable cradle mounted to have both vertical and inclined oscillatory movement relatively to its supporting frame, means for closing and opening said cradle, means for oscillating said cradle in a plane inclined to the horizontal, means for moving said cradle longitudinally, and means for oscillating said cradle in a vertical plane.

In order to more clearly disclose the construction, operation and use of the invention, reference should be had to the accompanying drawings forming part of the present application.

Throughout the several figures of the drawings, like reference characters designate the same parts.

In the drawings: Figure 1 is a plan view of the shocker attachment complete, showing, in dotted lines, the cradle in position about to deposit a shock; Fig. 2 is a rear end elevation of the machine, with the cradle in position to receive sheaves; Fig. 3 is a detail side elevation of the mechanism for moving the shocker longitudinally of its frame; Fig. 4 is a detail side elevation of the mechanism for rotating the cradle to shock depositing position; Fig. 5 is an enlarged detail side elevation of the rack and pinion for moving the cradle longitudinally; Fig. 6 is an enlarged detail of the intermittent gears for oscillating the cradle in a plane inclined to the horizontal; Fig. 7 is a perspective of the harvester table, detached, and the retaining device for holding the sheaves; Fig. 8 is a detail side elevation of the segment gears for oscillating the cradle in a vertical plane; Fig. 9 is a side elevation of the catch for holding the cradle in closed position; and Fig. 10 is an enlarged fragmentary detail, showing the neutral clutch enlarged.

A substantial wheeled framework of any desired construction may be used for supporting the several working parts of the attachment. This framework may be either rigidly or detachably connected to the usual harvester frame in any of the usual and well known ways of connecting similar attachments to harvester frames.

In the preferred form of the attachment, the frame comprises longitudinal rods or bars 1, connected near one end by a transverse beam 2 and braces or struts 3 to hold the bars 1 rigid and maintain their relative positions to one another.

A transverse rod 4 is revolubly mounted in blocks 5, slidably mounted on the bars 1 and extending through this rod at an angle to its longitudinal axis, is revolubly mounted a post 6, provided on its lower end with an intermittent bevel pinion 7 for revolving the post. To the upper part of the post are connected two coöperating cradle members 8 and 9, adapted to receive between them sheaves of grain from a harvester table. The intermittent pinion 7 is adapted to mesh with and be intermittently driven by a second intermittent pinion 10. The pinion 7 is provided with two diametrically opposite concave toothless portions 7ª, adapted to fit, in sliding contact, with the toothless portion of the pinion 10. As shown in Fig. 6, this sliding fit of the two toothless surfaces will act to prevent rotation of the pinion 7, while at the same time allowing rotation of the pinion 10. The toothed section of the pinion 10 is provided with the same number of gear teeth as each of the two toothed sections of the gear 7, thus the gear 7 will make a one half rotation to every complete rotation of the gear 10 and the gear 7 will be interrupted at the end of its first half rotation and remain stationary during a half rotation of the gear 10, at the end of which time both gears 7 and 10 will move through another half rotation. At the end of such partial rotation, the toothless portions will be in contact, and rotation of the gear 7 will be temporarily interrupted. The intermittent gear 10 is secured to the end of a stub shaft 11, to the upper end of which is fastened a pinion 12, adapted to be intermeshed with a pinion 13 secured to a stub shaft 14 passed through the beam 2 and carrying on its opposite end the bevel gear 15 driven by a bevel pinion 16 on the shaft 17, revolubly mounted in hangers depending from the under side of the beam 2. The opposite end of the shaft 17 has secured thereto a bevel pinion 18, adapted to mesh with and be driven by a smaller bevel pinion 19 on a continuously driven shaft 20, which may be operated from the harvester mechanism in any well known manner, as usual. The coöperation of the toothless sections of the intermediate gears 7 and 10 acts as a safeguard against excessive rotary movement of the cradle in either direction. The instant and duration of engagement of gears 12 and 13, and the duration of rotation of gear 13, are all dependent on the manual operation of the driver. If the driver is either a little early or a little late in such operation, considerable damage might result, except for such coöperating toothless sections.

It is desired, of course, to drive the shaft 17 only intermittently from the shaft 20, so that the cradle and the shaft 4 may be partially rotated and moved only when it is loaded. For this purpose, the gear 18 is provided with a hub that fits over the end of the shaft 17 and revolves freely thereon. This hub is provided with a clutch face 21, adapted to coöperate with a clutch 22 slidably keyed on the shaft 17 and provided with a collar adapted to be engaged by the fork of an operating lever 23, pivotally mounted on the beam 2 and operable by the harvester driver through suitable connections 24. Between the clutch 22 and a collar on the shaft 17, is interposed a coil spring 25, which acts normally to keep the clutch and sleeve in engagement. Thus the shaft 17 may be driven from the shaft 20 at any time, and for any desired length of time. When the cradle is in position to be loaded, the gears 12 and 13 will be in mesh. Consequently, rotation of the shaft 17, at such time, will effect rotation of the post 6 and attached cradle 8 and 9, in a plane inclined to the horizontal.

In order to deposit the shock from the cradle, it is necessary, of course, to swing the cradle, after rotation, from its normal horizontal position to a vertical position. Such movement of the cradle is effected by partial rotation of the rod 4 on which it is mounted. In order to so partially rotate the rod 4, a quadrant or segment gear 26 is secured to one end of the rod 4. This quadrant gear meshes with and is actuated by a similar segment gear 27, secured to a stub shaft mounted in the framework of the attachment. This second segment gear 27 may be operated by a suitable hand lever 28, and a chain of link rods and connecting levers, as shown in Fig. 4, the lever being placed near the seat of the harvester driver.

When the cradle has been rotated in a plane inclined to the horizontal by gears 12 and 13, and rotated vertically through segment gears 26 and 27, it should be moved longitudinally toward the rear of its supporting frame to deposit the shock. Such longitudinal movement is effected by coöperating racks and pinions operated from a countershaft 29, extending transversely of the frame, parallel to and adjacent the shaft 17. It is driven from the shaft 17 by intermeshing gears 30 and 31, on the shafts 17 and 29 respectively. The opposite ends of the shaft 29 are provided with pinions 32, adapted to engage and operate interiorly toothed yoke-shaped racks 33, which are loosely journaled on the opposite ends of the rod 4 on which the cradle 8 and 9 is mounted. Consequently, rotation of the shaft 29 will act to drive the racks 33, thus moving the rod 4 and cradle 8 and 9 longitudinally of its supporting frame. When the cradle has reached the rearward limit of its movement and the shock has been deposited, as will be hereinafter disclosed, it is necessary to return the cradle to its original position for reloading. The first step of this return movement is a longitudinal movement in a direction opposite to that last effected. Both longitudinal movements are effected by pinions 32 and racks 33. Consequently, means must be provided for maintaining the intermeshing of the pinions 32 and racks 33 during both longitudinal movements. In order to accomplish this result, each of the rack yokes 33 has been provided with a flange 34 extending along its upper edge and adapted to be engaged by a small roller 35 carried by a hanger 36 dropped from the framework of the attachment and having its lower end journaled upon the shaft 29. As the pinion 32 is rotated to drive the racks 33 rearwardly, it will engage the lower face of the rack. With the parts in this position, the roller 35 will travel in contact with the under face of the flange 34, thus maintaining the intermesh of the pinion with the lower face of the yoke rack. When the pinion reaches the forward end of the yoke rack, it will act to draw the rack slightly downward. At this instant, the forward end of the flange 34 reaches the roller 35, and the flange drops below the roller 35. The continued rotation of the pinion 32 starts forward movement of the yoke rack and the intermesh between the pinion and upper side of the rack yoke is maintained by engagement between the roller 35 and the upper face of the flange 34.

The yielding connection between each yoke rack 33 and the rod 4, comprises a spring-pressed neutral clutch member 37, slidably mounted on the rod 4, and a coöperating clutch face formed on the arm 38 of the yoke rack. Normally, the friction grip between the two clutch faces will act to keep the yokes raised, so that the pinion 32 will be in mesh with the lower set of rack teeth of the yoke rack, so that the roller 35 will pass under the flange 34 and maintain such engagement. As the pinion reaches the forward end of the yoke rack, it will draw the yoke rack downward, overcoming the frictional engagement between the clutch faces. As the pinion engages the rack teeth of the upper edge of the yoke rack, the spring-actuated clutch 37 will again become operative.

The complete cradle comprises a lower rigid cradle section 8 and an upper coöperating pivotally mounted cradle section 9. When the cradle is in position to receive sheaves from the usual table of the harvester the section 9 will be raised, as shown in Fig. 2. This is the normal position of the cradle. In order to maintain the upper section normally raised, it is provided with a projecting arm, which is connected with the cradle post by a spring 39. When the cradle has received a sufficient number of sheaves for a shock, it will be necessary to draw down the upper member 9, of course. This may be done automatically as the cradle is rotated in a plane inclined to the horizontal. The automatic closing device comprises a segment gear 40, mounted about or adjacent the lower part of the cradle post 6, a bevel pinion 41 secured to the lower cradle member adapted to mesh with and be driven by the segment gear and provided with a spool hub 42, and a flexible member 43 having its opposite ends connected respectively to the cradle section 9 and the spool hub 42. As the cradle is rotated in a plane inclined to the horizontal, the bevel pinion 41 will engage the segment gear 40 and wind up the flexible connection 43, the pinion and segment gear being so proportioned that, as the horizontal movement of the cradle is completed, the winding of the member 43 will have completely lowered the upper cradle member so that the cradle may be turned vertically without fear of dropping the sheaves. At this point, the pinion 41 leaves the segment gear 40. In order to prevent accidental opening of the cradle and consequent dropping of the sheaves, in subsequent movements of the cradle, a catch or holding device has been provided to secure the upper cradle section in its lowered or operative position. This catch comprises a pivoted, spring pressed plate 44, provided with a shoulder 45 and mounted on an offset of the lateral arm 46. This catch lies directly in the upward path of movement of the projecting arm of the cradle section 9. As the arm of the section moves upward, it will engage the lower beveled end of the plate 44, rock it on its pivot, and be seated on the shoulder 45. The plate 44 is so proportioned and positioned that its lower end which carries the shoulder 45 will normally project slightly into the upward path of movement of the arm projecting from the upper cradle section 9. In this way, the upper cradle section 9 will be caught and held in operative position as soon as it has been closed by winding up of the member 43. As the cradle reaches the rear of the supporting frame, it will be necessary, of course, to provide means for tripping the plate 44 to free the upper cradle section to the action of the spring 39, so that the cradle may be swung open to deposit the shock. The tripping device comprises a rod 47, pivoted to the arm 46 between its end and the offset. The rod 47 has an upturned portion at one end adapted to engage and swing the plate 44 to counteract the spring, so that its shoulder 45 will be disengaged from the arm of the cradle section 9. When near the end of the frame member 1, the rod 47 will be engaged by a stop 49 projecting from the member 1. As soon as the rod strikes the stop, it will swing the plate 44, which will free the cradle member 9 to the action of its spring 39, so that the cradle will be opened and the shock deposited.

In order to assist in the first or angular rotation of the cradle, an inclined arcuate supporting rail 50 has been secured to the frame of the attachment, in such position as to be adjacent the lower side of the rigid cradle section. The rigid cradle section is provided with an anti-friction bearing 51, adapted to travel over the face of the supporting rail 50.

Anti-friction rollers 48 may be provided on the end of the arm 46, and on the outer end of the lower cradle section to travel on the longitudinal frame members 1 and so aid in supporting the cradle thereon.

While the cradle is being turned and moved longitudinally to deposit the shock, it is necessary, of course, to prevent delivery of sheaves from the harvester table. Consequently, a retaining fork has been provided which coöperates with the sheaf table. A beam 53 extends from the harvester frame above the usual harvester table, and has pivotally mounted therein a rock shaft 54, provided with a plurality of curved retaining fork tines 55. These tines are held, normally, in operative position by a spring 56, connected at its opposite ends respectively to the rock shaft 54 and the beam 53. A catch 57 is pivoted to the beam 53, and is adapted to engage a pin or stud 58 on an arm 59 projecting from the rock shaft 54, to hold the tines 55 in raised position. A cord or light rope is connected to this catch for disengaging the catch from the pin 58, when desired. A rope, cable, or other device 60 is connected to the upper end of the arm 59, so that the shaft 54 may be rocked to move the tines 55 to inoperative position to allow the sheaves to pass from the harvester table. If desired, the cable 60 may be so connected to the cradle operating mechanism as to raise the tines 55 when the cradle is moved to position to receive the sheaves, and allow lowering of the tines as the cradle begins to turn, after it is loaded. Of course, its operation may be effected by the harvester driver independently of the operation of the other parts of the machine, in any convenient and well known manner.

Assuming the parts to be in the position shown in Fig. 2, and the cradle completely loaded, the operation of the machine is as follows: The cord or cable 60 will be released by the harvester driver to allow the tines 55 to drop to retaining position, and the cord or cable 24 will then be released by the harvester driver to free the clutch 22 to the action of its spring, so that the shaft 17 may be connected to and driven from the shaft 20. From the shaft 17 the train of gears 16, 15, 13, 12, 10 and 7 will operate to swing or revolve the cradle post and cradle angularly about the axis of the post 6. As the cradle swings, the pinion 41 will be engaged and operated by the segment gear 40 and the flexible member 43 will be wound on the spool 42, drawing down the upper cradle member 9 to closed position. As the cradle member 9 is drawn completely down, its projecting arm slides onto the shoulder 45 of the catch plate 44, thus holding the cradle closed. As soon as these two movements have been completed, the harvester driver will swing the lever 28 rearwardly, thereby rocking the shaft 4 about its longitudinal axis and so disengaging the gears 12 and 13 and rotating the closed cradle vertically. The yielding connection between the shaft 4 and the yoke racks 33 will force the lower racks of the yoke racks into engagement with the pinions 32 on the countershaft 29, which is driven from the shaft 17 through the gears 30 and 31. As soon as the pinions 32 engage the lower racks of the yoke racks 33, the yoke racks will be forced rearwardly, carrying with them the shaft 4 and its cradle. The gears 30 and 31 are so proportioned that the cradle will be moved rearwardly at the same rate that the harvester and shock attachment move forward, thus keeping the cradle practically stationary relatively to the ground over which the machine travels. As the cradle approaches the rear of the shocker frame, the end of the pivoted bar 47 will engage the stop 49 and trip the catch plate 44, freeing the cradle 9 to the action of the spring 39, and thus instantly opening the cradle to deposit the shock. At this moment, the pinions 32 will engage the forward end of the yoke racks 33 and draw the same downward,
so that the rollers 35 will travel along the tops of the flanges 34 and maintain the intermesh of the pinions 32 and the upper racks of the yoke rack 33, thus returning the shaft 4 and cradle to the forward part of the frame. As the cradle reaches its forward limit, the rollers 35 will run from the ends of the flanges 34, and the pinions 32 will lie in the toothless portions at the rear ends of the yoke racks 33. At this point, the segment gears 26 and 27 will be in mesh. The harvester driver now operates the lever 28, and so rotates the shaft 4 and swings the cradle to horizontal position. As soon as the cradle reaches its horizontal position, the gear 12 will mesh with the rotating gear 13, and the cradle will be rotated to position to receive sheaves from the harvester table. As soon as the open side of the cradle falls opposite the harvester table, the driver will pull the cord or cable 24 to disengage the clutch 22, and so discontinue the drive of the shaft 17 until the cradle has been again rotated. The entire operation will then be repeated.

It is clear that changes may be made in the construction, arrangement and disposition of the several parts of the invention, and it is meant to include all such within this application, wherein only a preferred form has been disclosed.

Having thus fully described our invention, what we claim as new, and desire to secure by Letters Patent, is:—

1. A shocker attachment of the character described, comprising a framework, a normally open cradle revolubly and longitudinally movably mounted in said framework, means for rotating said cradle in a plane inclined to the horizontal, means operated by such rotation and adapted to close said cradle, means for rotating said cradle in a vertical plane, means for moving said cradle longitudinally, and means for opening said cradle to deposit the shock.

2. A shocker attachment of the character described, comprising a framework, a normally open cradle revolubly and longitudinally movably mounted in said framework, means for rotating said cradle in a plane inclined to the horizontal, means operated by such rotation and adapted to close said cradle, means for holding said cradle in closed position, means for rotating said cradle in a vertical plane, means for moving said cradle longitudinally, means for tripping the holding means to free the cradle so that it may be opened, and means for opening said cradle to deposit the shock.

3. A shocker attachment of the character described, comprising a framework, a normally open cradle revolubly and longitudinally movably mounted in said framework, means for rotating said cradle in a plane inclined to the horizontal, means operated by such rotation and adapted to close said cradle, means for rotating said cradle in a vertical plane, means for moving said cradle longitudinally, means for opening said cradle to deposit the shock, and means for effecting return longitudinal movement of said cradle.

4. A shocker attachment of the character described, comprising a framework, a normally open cradle revolubly and longitudinally movably mounted in said framework, means for rotating said cradle in a plane inclined to the horizontal, means operated by such rotation and adapted to close said cradle, means for rotating said cradle in a vertical plane, means for moving said cradle longitudinally, means for opening said cradle to deposit the shock, means for effecting return longitudinal movement of said cradle, means for effecting return vertical movement of said cradle, and means for effecting return movement of said cradle in a plane inclined to the horizontal.

In witness whereof we have hereunto set our hands in the presence of two witnesses.

HENRY M. FRIESEN.
HEINRICH H. NIKKEL.

Witnesses:
PETER P. FUNK,
A. FRIESEN.